United States Patent
Park et al.

(10) Patent No.: US 8,092,388 B2
(45) Date of Patent: Jan. 10, 2012

(54) AUTOMATED VIEW CLASSIFICATION WITH ECHOCARDIOGRAPHIC DATA FOR GATE LOCALIZATION OR OTHER PURPOSES

(75) Inventors: Jin Hyeong Park, Princeton, NJ (US); Shaohua Kevin Zhou, Plainsboro, NJ (US); Constantine Simopoulos, San Francisco, CA (US); Joanne Otsuki, Oakland, CA (US); Dorin Comaniciu, Princeton Junction, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 632 days.

(21) Appl. No.: 12/210,419

(22) Filed: Sep. 15, 2008

(65) Prior Publication Data
US 2009/0088640 A1    Apr. 2, 2009

Related U.S. Application Data

(60) Provisional application No. 60/974,955, filed on Sep. 25, 2007.

(51) Int. Cl.
*A61B 8/00* (2006.01)
*A61B 8/08* (2006.01)

(52) U.S. Cl. ........ 600/450; 600/437; 600/441; 600/443; 600/453; 600/454; 600/455; 600/457; 600/463

(58) Field of Classification Search ................. None
See application file for complete search history.

(56) References Cited

U.S. PATENT DOCUMENTS

| | | |
|---|---|---|
| 2002/0007117 A1 | 1/2002 | Ebadollahi et al. |
| 2006/0034513 A1 | 2/2006 | Cai et al. |
| 2006/0064017 A1 | 3/2006 | Krishnan et al. |
| 2006/0171586 A1 | 8/2006 | Georgescu et al. |
| 2006/0241455 A1 * | 10/2006 | Shvarts ................. 600/447 |
| 2007/0055153 A1 | 3/2007 | Simopoulos et al. |

FOREIGN PATENT DOCUMENTS

WO    2006/011891 A    2/2006

OTHER PUBLICATIONS

Zhou et al., "Image-Based Multiclass Boosting and Echocardiographic View Classification", Computer Vision and Pattern Recognition, 2006 IEEE Computer Society Conference on New York, NY, Jun. 17-22, 2006, Piscataway, NJ, IEEE, vol. 2, Jun. 17, 2006, pp. 1559-1565.

Zhang et al., "Joint Real-time Object Detection and Pose Estimation Using Probabilistic Boosting Network", Jun. 1, 2007, Computer Vision and Pattern Recognition, IEEE Conference on IEEE, Piscataway, NJ, pp. 1-8.

(Continued)

*Primary Examiner* — Unsu Jung

(57) ABSTRACT

A view represented by echocardiographic data is classified. A probabilistic boosting network is used to classify the view. The probabilistic boosting network may include multiple levels where each level has a multi-class local structure classifier and a plurality of local-structure detectors corresponding to the respective multiple classes. In each level, the local structure is classified as a particular view and then the local structure is detected to determine whether the currently selected local structure corresponds to the class. The view classification may be used to determine gate locations, such as a gate for spectral Doppler analysis.

7 Claims, 3 Drawing Sheets

OTHER PUBLICATIONS

Ebadollahi et al., "Automatic view recognition in echocardiogram videos using parts-based representation", Jun. 27, 2004, Computer Vision and Pattern Recognition 2004, Proceedings of the 2004 IEEE Computer Society Conference on Washington, DC, Jun. 27-Jul. 2, 2004, IEEE, Piscataway, NJ, pp. 2-9.

Aschkenasy et al., "Unsupervised image classification of medical ultrasound data by multiresolution elastic registration", Jul. 1, 2006, Ultrasound in Medicine and Biology, New York, NY, pp. 1047-1054.

International Search Report including Notification of Transmittal of the International Search Report, International Search Report, and Written Opinion of the International Searching Authority PCT/US2008/010902, Jan. 29, 2009.

U.S. Appl. No. 11/775,538, filed Jul. 10, 2007.

Feigenbaum, H., W., A., Ryan, T.: Feigebaum's Echocardiography. Lippincott Williams & Wilkins 2005, pp. 317-318 and 357-359.

Georgescu, B., Zhou, X.S., Comaniciu, D., Gupta, A.: Database-guided segmentation of anatomical structures with complex appearance. In: CVPR. 2005 429-436.

Aschkenasy, S.V., Jansen, C., Osterwalder, R., Linka, A., Unser, M., Marsch, S., Hunziker, P.: Unsupervised image classification of medical ultrasound data by multiresolution ela stic registration. Ultrasound in Medicine and Biology 32(7) (2006) 1047-1054.

Zhou, S.K., Park, J., Georgescu, B., Simopoulos, J., Otsuki, J., Comaniciu, D.:Image-based multi class boosting and echocardiographic view classification. In: CVPR. 2006 1559-1565.

Friedman, J., Haste, T., Tibshirani, R.: Additive logistic regression: a statistical view of boosting. Ann Statist. 28(2) (2000) 337-407.

S. Ebadollahi, S.-F. Chang. and H. Wu, Automatic view recognition in echocardiogram videos using parts-based representation. In CVPR, vol. II, pp. 2-9, 2004.

Y. Freund and R. Schapire. A decision-theoretic generalization of online leaning and an application to boosting. Journal of Computer and System Sciences, 5(1):119-139,1997.

M. Oren, C. Papageorgiou, S. P., O. E., and T. Poggio. Pedestrian detection using wavelet templates. In CVPR, pp. 193-199, 1997.

Z Tu. Probabilistic boosting-tree: Learning discriminative models for classification recognition and clustering. In ICCV, pp. 1589-1596, 2005.

* cited by examiner

AUTOMATED VIEW CLASSIFICATION WITH ECHOCARDIOGRAPHIC DATA FOR GATE LOCALIZATION OR OTHER PURPOSES

RELATED APPLICATIONS

The present patent document claims the benefit of the filing date under 35 U.S.C. §119(e) of Provisional U.S. Patent Application Ser. No. 60/974,955, filed Sep. 25, 2007, which is hereby incorporated by reference.

BACKGROUND

The present embodiments relate to medical diagnostic ultrasound imaging. In particular, views of desired planes are automatically classified.

Spectral Doppler echocardiography is widely used to assess cardiovascular function and pathology, such as valvular regurgitation and stenosis. The velocity of blood or moving structures is determined from the Doppler effect of ultrasound waves. To acquire a Doppler echocardiogram, a sonographer places a Doppler or range gate on the screen at the location where the blood velocity is to be measured. However, placement may be inconsistent between sonographers or for a same sonographer at different times. This variation may result in gathering less diagnostically useful information.

The velocity may be measured at different locations or a same location for different views. For example, standard echocardiography views include apical two, three, four and five chamber views. Each view includes the left ventricle, but different views shows different valves. A gate may be located by the mitral valve (MV), the tricuspid valve (TV), or the aortic valve (AV) depending on the type of view. It may be difficult for a sonographer to properly identify the view and the location or locations for spectral Doppler analysis. It may be time consuming to position the range gate.

BRIEF SUMMARY

By way of introduction, the preferred embodiments described below include methods, computer readable media and systems for classifying a view represented by echocardiographic data. A probabilistic boosting network is used to classify the view. The probabilistic boosting network may include multiple levels where each level has a multi-class local structure classifier and a plurality of local-structure detectors corresponding to the respective multiple classes. In each level, the local structure is classified as a particular view and then an attempt is made to detect the local structure to determine whether the currently selected local structure corresponds to the class. The view classification may be used to determine gate locations, such as a gate for spectral Doppler analysis.

In one embodiment, multiple class global structure classifiers, hypothesis fusion, and/or other operations further classify for any local structures sufficiently representing the class according to the probabilistic boosting network. Once the view is classified, a valve or spectral Doppler gate location may be identified. The shape of the local structure is determined in order to automatically position the spectral Doppler gate.

In a first aspect, a method is provided for classification of a view from echocardiographic data. Local structure represented by the echocardiographic data is classified as a first of a plurality of possible views. A local structure detector specific to the first of the possible views is selected in response to the classifying. The local structure detector is applied to the echocardiographic data. Whether the echocardiographic data represents a local structure is determined in response to the applying.

In a second aspect, a computer readable storage medium has stored therein data representing instructions executable by a programmed processor for classification of a view from echocardiographic data. The storage medium includes instructions for classifying, with a first machine learnt multi-class local structure classifier, each of a plurality of echocardiographic data sets associated with different search positions of a window on an image as a cardiac standard view and selecting, for each of the echocardiographic data sets, a first machine learnt local structure detector as a function of the classified cardiac standard view, different first local structure detectors being available for each of the cardiac standard views. The instructions also include detecting, with the selected first local structure detector and for each echocardiographic data set, whether the echocardiographic data sets include local structure and ceasing processing of each of the echocardiographic data sets where the local structure is not detected. For each of the echocardiographic data sets where the local structure is detected, the instructions include repeating the classifying, selecting and detecting with a second machine learnt multi-class local structure classifier and second machine learnt local structure detectors, different second local structure detectors being available for each of the cardiac standard views, the second machine learnt multi-class local structure classifier being more discriminative than the first machine learnt multi-class local structure classifier, and the second machine learnt local structure detectors being different than the respective first machine learnt local structure detectors.

In a third aspect, a system for classification of a view from echocardiographic data is provided. A memory is operable to store ultrasound data representing a plane through a heart volume. A processor is operable to classify the view corresponding to the plane as a function of a probabilistic boosting network. A display is operable to display an image of the view and a location indicator, the location indicator position being a function of the view.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

An algorithm may provide automatic Doppler gate localization in spectral Doppler echocardiography. The algorithm uses B-mode image information. The algorithm has two components: 1) cardiac standard view classification and 2) gate location inference. Cardiac view classification may be used for other purposes. For cardiac view classification, the probabilistic boosting network (PBN) principle is incorporated with local-structure-dependent object classification. The PBN may provide more efficient processing as the PBN breaks down the computational dependency on the number of classes. PBN may be scalable to any number of object classes (e.g., views).

To automate the gate localization, the cardiac view represented by an image is identified. In each standard cardiac view, there are different valves and different optimal locations for the Doppler gate. The gate location may be computed using a data-driven shape inference or other approach. The approach depends on the view that an image represents. The algorithm may be a real time solution to automated Doppler gate placement in the clinical environment. Automatic placement of the Doppler gate may improve workflow by eliminating time consuming manual Doppler gate positioning and reduce the user dependency of the exams.

The algorithm may use data-driven machine learning techniques customized for medical image analysis tasks, such as left ventricle (LV) detection in noisy echo images. Binary classification, multi-class classification, shape inference, or other machine learning approaches may be used. For example, the inference model for gate location determination, given a view, is based on a database-guided segmentation approach. A function that computes the LV shape and the gate location using an image patch is learned. The LV shape and the gate location are inferred simultaneously using a shape inference algorithm.

Figure 1:
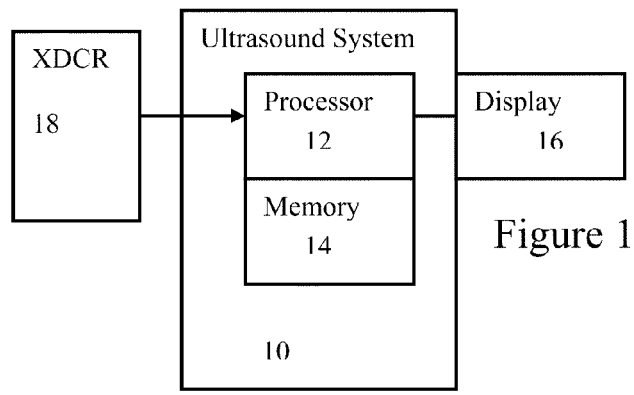
FIG. 1 is a block diagram of one embodiment of a system for classification of a view from echocardiographic data.

FIG. 1 shows a system 10 for classification of a view from echocardiographic data. The system 10 is a medical diagnostic ultrasound imaging system, but may be a computer, workstation, database, server, or other system. The system 10 classifies an image or frame of data as representing or not a particular view. The classification may be output and/or used for further processing, such as identifying a gate location for spectral Doppler imaging based on the view. The classification may be implemented with an algorithm, such as a machine-trained matrix.

The system 10 includes a processor 12, a memory 14, a display 16, and a transducer 18. Additional, different, or fewer components may be provided. For example, the system 10 includes a transmit beamformer, receive beamformer, B-mode detector, Doppler detector, harmonic response detector, contrast agent detector, scan converter, filter, combinations thereof, or other now known or later developed medical diagnostic ultrasound system components. As another example, the transducer 18 is not provided, such as where the system 10 is a workstation for off-line or later classification of stored or transferred echocardiographic data.

The transducer 18 is a piezoelectric or capacitive device operable to convert between acoustic and electrical energy. The transducer 18 is an array of elements, such as a one or multi-dimensional array. Alternatively, the transducer 18 is a wobbler for mechanical scanning in one dimension and electrical scanning in another dimension.

The system 10 uses the transducer 18 to scan a planar region or a volume. Electrical and/or mechanical steering allows transmission and reception along different scan lines. Any scan pattern may be used. In one embodiment, the transmit beam is wide enough for reception along a plurality of scan lines. In another embodiment, a plane, collimated or diverging transmit waveform is provided for reception along a plurality, large number, or all scan lines.

Ultrasound data representing a plane or volume is provided in response to the scanning. The ultrasound data is beam-formed, detected, and/or scan converted. The ultrasound data may be in any format, such as polar coordinate, Cartesian coordinate, a three-dimensional grid, two-dimensional planes in Cartesian coordinate with polar coordinate spacing between planes, or other format. The ultrasound data is echocardiographic data. The ultrasound data represents the heart at a given time, such as end diastole and/or end systole. B-mode, flow mode, color Doppler, harmonic, contrast agent, or other modes of imaging may be used.

In one embodiment for automated positioning of a range gate, the system 10 includes a spectral Doppler detector. Using samples representing the range gate at different times, a spectrum associated with flow or movement at the location is determined. The spectral Doppler detector uses frequency shift to estimate the power of flow as a function of velocity at the range gate location. By performing the estimate at different times, such as with a moving window, a spectral Doppler image of the power of flow as a function of velocity as a function of time is generated (velocity along the y-axis, pixel intensity modulated by power, and time along the x-axis). Other spectral displays may be generated for the range gate, such as a spectrum graph. Using the view classification, the location for spectral analysis may be indicated. The range gate for spectral analysis is placed at the location indicator, such as adjacent a heart valve.

The memory 14 is a buffer, cache, RAM, removable media, hard drive, magnetic, optical, database, or other now known or later developed memory. The memory 14 is a single device or group of two or more devices. The memory 14 is shown within the system 10, but may be outside or remote from other components of the system 10.

The memory 14 stores the ultrasound data, such as ultrasound data representing a heart volume or representing a plane through a heart volume. Using a program and/or user input, a plane through the volume may be selected. The heart volume is a volume including at least a portion of the heart. The memory 14 stores flow (e.g., velocity, energy or both) and/or B-mode ultrasound data. Alternatively, the medical image data is transferred to the processor 12 from another device. The medical image data represents a planar region at a given time or in a sequence.

For real-time imaging, the ultrasound data bypasses the memory 14, is temporarily stored in the memory 14, or is loaded from the memory 14. Real-time imaging may allow delay of a fraction of seconds, or even seconds, between acquisition of data and imaging. For example, real-time imaging is provided by generating the images substantially simultaneously with the acquisition of the data by scanning. While scanning to acquire a next or subsequent frame of data, an image is generated for a previous frame of data. The imaging occurs during the same imaging session used to acquire the data. The amount of delay between acquisition and imaging for real-time operation may vary. The delay may allow for view classification, but not be or barely be noticeable to the user. In alternative embodiments, the ultrasound data is stored in the memory 14 from a previous imaging session and used for classification without concurrent acquisition.

The memory 14 is additionally or alternatively a computer readable storage medium with processing instructions. The memory 14 stores data representing instructions executable by the programmed processor 12 for classification of a view from echocardiographic data. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multi-processing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 12 is a general processor, digital signal processor, three-dimensional data processor, graphics processing unit, application specific integrated circuit, field programmable gate array, digital circuit, analog circuit, combinations thereof, or other now known or later developed device for processing medical image data. The processor 12 is a single device, a plurality of devices, or a network. For more than one device, parallel or sequential division of processing may be used. Different devices making up the processor 12 may perform different functions, such as a scanning controller and an image generator operating separately. In one embodiment, the processor 12 is a control processor or other processor of a medical diagnostic imaging system, such as a medical diagnostic ultrasound imaging system processor. The processor 12 operates pursuant to stored instructions to perform various acts described herein, such as obtaining data, classifying views, and/or controlling imaging.

In one embodiment, the processor 12 receives acquired ultrasound data during or after scanning and classifies the view represented by the data. The processor 12 performs or controls other components to perform the methods described herein.

The processor 12 performs machine learning and/or applies a machine-learnt algorithm. For application, the processor 12 calculates features for classification. The data representing the plane is classified with a machine-learnt algorithm. In one embodiment shown in FIG. 2, the classifier includes a probabilistic boosting network 30, which anchors a local structure such as LV. The probabilistic boosting network 30 improves the computation time of anchoring the local structure using detectors and multi-class classifiers. The probabilistic boosting network 30 includes multiple levels where each level includes a multi-class view classifier 32 and a plurality of class-specific local structure detectors 34. Each level has a different discrimination strength. For example, the discrimination strength gets stronger from the top level to bottom level.

The multi-class view classifier 32 is a multi-class local structure classifier. Any local structure, such as the left ventricle, may be classified into one of the pre-defined classes. A window sized to approximate the left ventricle area is applied to the data. The windowed data is classified as being the left ventricle for a particular view. For example, the data is closest to representing the left ventricle of an A4C view, not A2C, A3C, or A5C views. Even though the window-sized region is far from the left ventricle, the windowed data is classified into one of the classes. The windowed data not representing the left ventricle may be filtered out in the local structure detector 34. Any number of classes, any local structure, and/or any windowing may be used. The multi-class view classifier 32, using the learned features, outputs a view most likely represented by the data.

The classification is performed for different window locations (e.g., translations, scales, and/or orientations). The processor 12 (FIG. 1) searches different locations within the plane, and classifies for each of the different locations.

The multi-class view classifier 32 may avoid application of detectors for different types of views having to be applied to the data for each window. Instead, the class is used to select a detector 34 trained or programmed for the specific view. Each detector 34 is a same type of algorithm, but different algorithms may be used for different detectors 34. The same and/or different features may be applied by each detector 34.

The detector 34 detects local structure. In the example above, the selected detector 34 identifies whether a left ventricle structure is in the current window location. If not, the process for the current window location ends, limiting unneeded and inefficient processing. If the structure is identified, the process continues to the next level of multi-class local structure classifier 32 and local structure detectors 34. The multi-class local structure classifier 32 of the next level may classify the data of the window as the same or a different view than for the previous level. Any number of levels may be used. Each level uses different classifiers, detectors, and/or features than other levels. For example, the classifier 32 and detectors 34 of each subsequent level are trained to be more discriminative than the previous levels. Different levels may be trained to consider different aspects of local structure, such as using features more likely to highlight a specific anatomy associated with part of the local structure. Alternatively, the different levels are trained to consider the same overall local structure.

Any features may be used. Different types of features may be used for the same classifier 32 or detector 34, or all of the features are of a same type for a given classifier 32 or detector 34. In one embodiment, Haar wavelet-like features are calculated. Haar wavelet-like features represent the difference between different portions of a region. Any number of features may be used, such as tens, hundreds, or thousands. The machine learning process may determine a desired subset or set of features to be used for a given classification or detection task.

Any classifier 32 or detector 34 may be applied, such as a model-based classifier or a learned classifier (e.g., classifier based on machine learning). For learned classifiers, binary or multi-class classifiers may be used, such as Bayesian, boosting or neural network classifiers. The classifier 32 and/or detector 34 are instructions, a matrix, learned code, or other software and/or hardware for distinguishing between information in a medical image. In one embodiment, the classifiers 32 and detectors 34 are a machine-trained probabilistic boosting tree. Each classifier 32 and detector 34 is constructed as a tree structure. The machine-trained probabilistic boosting tree is trained from a training data set. The processor 12 is operable to implement the machine-trained probabilistic boosting network 30.

For a given set of data or image, the probabilistic boosting network 30 may identify one or more window regions corresponding to one or more views. In one embodiment, the probabilistic boosting network 30 is trained to identify one view for the image. In another embodiment, further processing is performed. The probabilistic boosting network 30 identifies multiple windows as representing the local structure in one or more corresponding views. Further processing provides a final classification.

Figure 2:
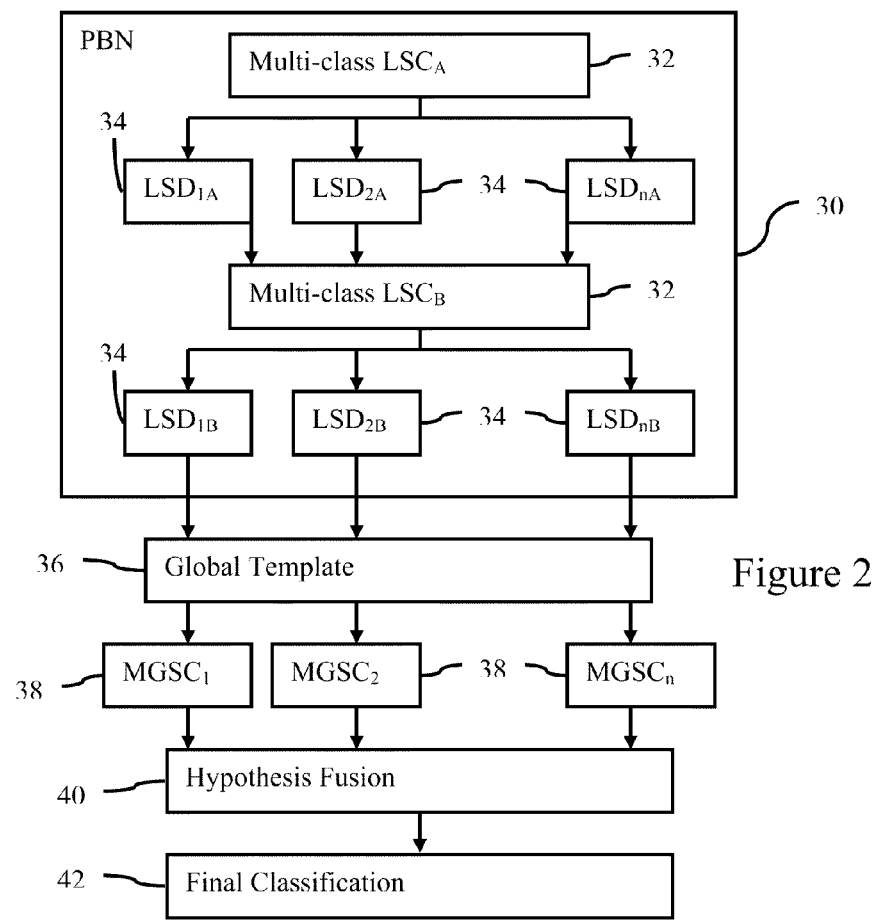
FIG. 2 is a graphical representation of instructions for classifying a view according to one embodiment.

FIG. 2 shows one embodiment of the further classification. This further classification is disclosed in U.S. Published Patent Application No. 20090034808 (Ser. No. 11/775,538, filed Jul. 10, 2007), the disclosure of which is incorporated herein by reference. A global template 36 expands the detected local structure. Given the classified view, the window region is expanded to include other view-associated structures (e.g., expanded in particular directions to include other heart chambers). The global region is classified by multi-class global structure classifiers 38. A multi-class global structure classifier 38 is provided for each view. The multi-class global structure classifier 38 is trained using false positives associated with other views and true positives associated with the correct view. A global region, which is constructed using an output candidate by a local structure detector 34, is classified by the local structure's corresponding global structure classifier 38. For instance, $LSD_1$ of 34 produces a candidate, and the corresponding global region is classified only using $MGSC_1$. A hypothesis fusion 40 is trained to determine the actual classification given the outputs of the multi-class global structure classifiers 38. A final classification 42 is output. Other processes may be used.

The processor 12 may output the view. Alternatively, the view is used for additional processing, such as segmentation and/or determination of spectral Doppler gate position. For example, the segmentation described in U.S. Published Patent Application No. 2006/0171586, the disclosure of which is incorporated herein by reference, is used. Using database based segmentation, a plurality of points (e.g., 17 points) show the left ventricle shape. An inference model is trained to position the points on the view or image. The input data is normalized to have a vertical orientation for the left ventricle and have a predetermined size. The inference model is also trained to position a point for each valve or gate location near a valve. The inference model applies regression to determine the left ventricle border and the gate positions. The gate position indicates a location for spectral analysis.

The display 16 is a CRT, LCD, plasma, projector, printer, or other output device for showing an image, text, view label, and/or gate location indicator. The display 16 displays an image of the detected plane, such as an image of the detected standard plane (e.g., A4C). The data representing the plane is used for generating the image.

Figure 3:
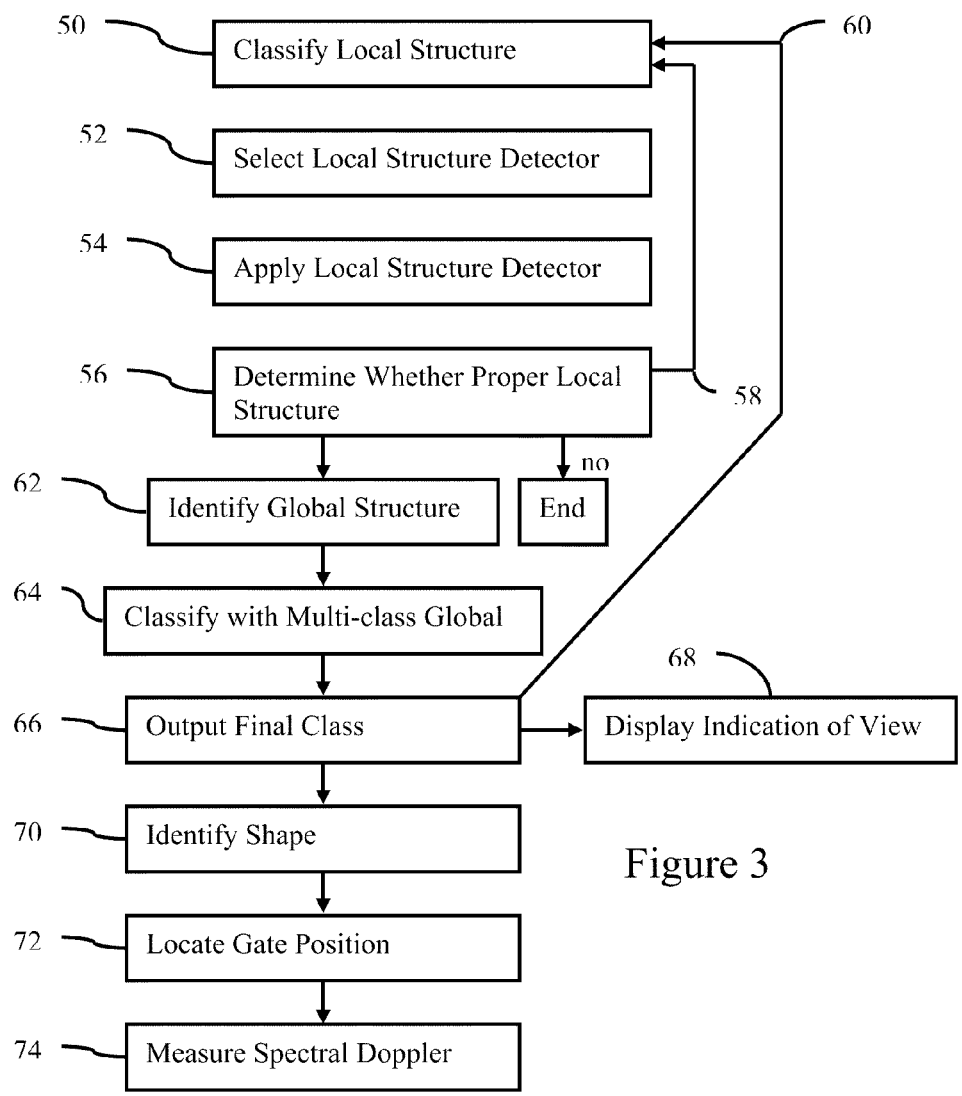
FIG. 3 is a flow chart diagram of embodiments of a method for classification of a view from echocardiographic data.

FIG. 3 shows a method for classification of a view from echocardiographic data. The method is implemented by a medical diagnostic imaging system, a review station, a workstation, a computer, a PACS station, a server, combinations thereof, or other device for image processing medical ultrasound data. For example, the system 10 or computer readable media shown in FIG. 1 implements the method, but other systems may be used. The method implements the classifier represented in FIG. 2, the probabilistic boosting network 30, or different classifiers or networks.

The method is implemented in the order shown or a different order. Additional, different, or fewer acts may be performed. For example, acts 62-74 are optional. As another example, repetitions represented at acts 58 and/or 60 are not provided.

The acts are performed in real-time, such as during scanning. The user may view images of a classified view and/or spectral Doppler images for an automatically positioned gate while scanning to acquire further data. The images may be associated with previous scanning in the same imaging session, but with different data. Alternatively, the acts are performed off-line, such as at a review station after the imaging session is complete.

One or more sets of echocardiographic data are obtained. The ultrasound data corresponds to a displayed image (e.g., detected and scan converted ultrasound data), beamformed data, detected data, and/or scan converted data. The ultrasound data represents at least a plane through the heart of a patient. The plane includes tissue, fluid or other structures. Different structures or types of structures react to the acoustic energy differently. For example, heart muscle tissue moves, but slowly as compared to fluid. The temporal reaction may result in different velocity or flow data. The shape of a structure or spatial aspect may be reflected in B-mode data. One or more objects, such as the heart, an organ, a vessel, fluid chamber, clot, lesion, muscle, and/or tissue are within the volume region. The data represents the region.

Acts 50-56 represent a probabilistic boosting network, but other computer learnt hierarchal, tree, or network structures may be used. Acts 50-56 represent application of machine learnt multi-class local structure classifiers and machine learnt local structure detectors. Other classifier and/or detector arrangements or order of application may be used. In one embodiment, a single pass through acts 50-56 is provided. In other embodiments, acts 50-56 are repeated in act 58 and/or act 60.

The basic framework of the algorithm is to anchor a relatively stable (rigid) local structure of each object class. Any number of object classes may be used, such as four apical views. Any structure may be used, such as the left ventricle, as the local structure. In acts 62-66, a global structure is then extracted based on the anchored local structure and further classified using multi-class classifiers. The probabilistic boosting network is used to provide efficient or quick processing, lessening linear computational dependency on the number of classes.

In act 50, a local structure represented by the echocardiographic data is classified as one of a plurality of possible views. A machine-learnt multi-class local structure classifier classifies the local structure. Any classifier or classifiers may be used. The classifier may be a model or detector using image processing, filtering, or other techniques. A collection of different classifiers, cascaded classifiers, hierarchal classifier, model-based classifier, classifier based on machine learning, combinations thereof, or other multi-class classifier may be used. Multi-class classifiers include CART, K-nearest neighbors, neural network (e.g., multi-layer perceptron), mixture models, boosting, support vector machine, or others. A probabilistic boosting tree may be used. Error-correcting output code (ECOC) may be used.

The classifier is trained from a training data set using a computer. In one embodiment, the classifier is a knowledge-based probabilistic model, such as marginal space learning using a hierarchical search. A database of known cases is collected for machine learning, providing a database-driven knowledge-based approach. Knowledge is embedded in large annotated data repositories where expert clinicians manually indicate the view associated with images of a particular local structure. The known cases are spatially aligned or registered, such as by aligning the coordinate system to a left ventricle axis and a set scale. The multi-class classifier is trained on a large number of annotated images of the isolated local structure.

For learning-based approaches, the classifier is taught to distinguish based on features. For example, a probability model algorithm selectively combines features into a strong committee of weak learners based on Haar-like local rectangle filters whose rapid computation is enabled by the use of an integral image. Features that are relevant to the local structure of different views are extracted and learned in a machine algorithm based on the experts' annotations, resulting in a probabilistic model for local structure of different views. A large pool of features may be extracted. The training determines the most determinative features for a given classification and discards non-determinative features.

A probabilistic boosting tree (PBT), which unifies classification, recognition, and clustering into one treatment, may be used. For example, the multi-class classifiers 32 and detectors 34 of the probabilistic boosting network 30 shown in FIG. 2 are trained as a probabilistic boosting tree. The classifier is a tree-based structure with which the posterior probabilities of the presence of the local structure in a given view are calculated from given data. Each detector or classifier not only provides a decision for a given sample, but also a confidence value associated with the decision. The nodes in the tree are constructed by a combination of simple classifiers using boosting techniques, such as disclosed by Tu, "Probabilistic Boosting-Tree: Learning Discriminative Models for Classification, Recognition, and Clustering," Proc. Int'l Conf. on Computer Vision, pp 1589-1596, 2005. Separate or other grouping of training for different levels, or for the multi-class classifiers as compared to the detectors may be used.

In the example represented by FIG. 2, the one multi-class local structure classifier (MC_LSC) is trained and configured to multiple levels in a hierarchical structure, $MC\_LSC_1, \ldots, MC\_LSC_n$. To classify a local structure, the levels are applied sequentially (e.g., from $MC\_LSC_1$ to $MC\_LSC_n$). The multi-class local structure classifier 32 and the four detectors 34 are trained using the multi-class logit boosting based image classification approach.

In act 50, the multi-class local structure classifier of a first level is applied. Given an image, a window is located at different positions. Each window position identifies an echocardiographic data set to be classified as a particular view. For each position, the local structure designated by the window is classified. Act 50 represents the application for one window position.

The window is of any size and shape. For example, the input data is scaled based on known acquisition settings or other criteria to more closely match a norm. A square region corresponding to typical (e.g., average), standard deviation (e.g., ⅔ of training cases), or other threshold in size designates the local structure data to be classified. Any search or window positioning criteria may be used, such as shifting by one or more pixels. Sparse or more exhaustive searching may be used. The window is moved to different search positions by translation, orientation, scale, or combinations thereof. In one embodiment, the search space has five dimensions: (x, y) location, width, height and angle, represented as $(x, y, w, h, \theta)$.

The training and classification may include any number of views. In one example, the class includes A2C, A3C, A4C, and A5C. Short axis views may be included or used as alternatives. Standard views are used, but non-standard views may be used additionally or alternatively. The standard views are set by a medical association, a hospital, a practice, or a particular doctor. The local structure is the left ventricle, but different local structures (e.g., valves or other chambers) may be used. The local structure may include a plurality of anatomy features, a single anatomy feature, a portion of an anatomy feature, or combinations thereof.

To apply the classifier, the discriminative features are calculated. The features are calculated for a given window position. The features are calculated from the echocardiographic data identified by the current window position. In one embodiment, features are calculated from the data at different resolutions. A volume pyramid is provided, such that the data set is down sampled to different resolutions. For example, one set of data has fine resolution, such as the scan resolution, and another set of data has a coarse resolution, such as the fine set decimated by ¼ in each dimension (i.e., down sample by a factor of 4). The sets represent the same object in the same volume. Any number (one, two, or more) sets may be used. Features are calculated from a coarse set and then in a fine set of the volume pyramid. The machine learning may determine the determinative features. For each determinative feature, a data set at the corresponding resolution is provided. Other features may be calculated regardless of the view, such as where a feature for a patient may be determinative in combination with features for a possible view.

The feature values for the current local structure are input to the multi-class classifier. The classifier outputs a view. The view is one of the standard views or other specific view. In an alternative embodiment, one possible output by the multi-class classifier is that the data does not represent one of the views.

In act 52, a local structure detector is selected. Each local structure detector is specific to a view. For example, A2C, A3C, A4C, and A5C local structure detectors are trained for detecting the left ventricle or other local structure shown in the corresponding view. In response to the classification of the view in act 50, the detector corresponding to the view is selected. Each detector is a machine learnt local structure detector. Each local structure detector ($LSD_i$), where $i \in [1, C]$, is independently applied to echocardiographic data. The $LSD_i$ provides positive candidates of the local structure of the $I^{th}$ object class. By selecting the local structure detector based on the classified view, only the selected local structure detectors may be applied, reducing the number of calculations associated with applying each detector where view information is not available.

In act 54, the selected local structure detector is applied. The detector is applied to the echocardiographic data designated by the current window position. The local structure detector is a machine learnt detector, and may be trained as any of the machine learning algorithms discussed above for the classifier. In one embodiment, each local detector, $LSD_i$, is trained based on Probabilistic Boosting Tree (PBT) that treats the detection problem as a two-class classification problem (positive class versus negative class). Other binary classifiers or detectors may be used, such as a model-based detector.

The selected local structure detector determines whether the echocardiographic data represents the local structure (e.g., left ventricle) associated with the specific view in act 56. The determination may be binary (e.g., yes/no) or probabilistic (e.g., 60%). Based on the output, a determination is made as to whether the window is associated with the local structure for that view. If the local structure is not detected, the processing for the window is ceased. The window is considered to not represent the left ventricle for any view. This negative exclusion allows the process to continue to the next window location in the repetition of act 60.

In act 58, the classifying of act 50, selecting of act 52, applying of act 54, and determining of act 56 are repeated for a different level of the probabilistic boosting network. The repetition is for the same echocardiographic data (i.e., defined by the same window location). The local structure is again classified as belonging to a view and the local structure is again detected or not as a function of the view.

The repetition for the different level applies different multi-class local structure classifier and/or view specific local structure detectors. For each data set associated with a window position where local structure is detected, one or more additional machine learnt classifiers and detectors are applied to more discriminatively determine whether the data represents local structure of a particular view. A different classifier is trained with the same or different data, uses the same or different features, and/or is the same or different type of classifier as compared to the other levels. Similarly, the different detectors are trained with the same or different data, use the same or different features, and/or are the same or different type of detector as compared to the other levels.

The weak multi-class local structure classifiers and local structure detectors are divided into several parts to form the probabilistic boosting network framework. To limit the number of calculations, more processing intensive, relatively stronger classifiers and/or detectors are put at later levels. The hierarchical structure is applied in multiple levels of weak detectors, but each level is associated with a stronger detector than the last for a given view. The hierarchical structure implemented by repetition enables negative exclusion as soon as possible from early layers. In alternative or additional embodiments, the classifiers and/or detectors at two or more different levels are not weaker or stronger, but apply different criteria (e.g., features).

Any numbers of repetitions may be used. For example, only two levels are provided in the probabilistic boosting or other hierarchal network. As another example, three or more repetitions are provided. Each repetition either rules out windowed data as representing local structure of a particular view or continues. Once ruled out, further processing for the window position is ceased. Each level may indicate a different view than a previous level due to the differences in the multi-class classifier. The final level, where the windowed data represents or likely represents local structure of a particular view, outputs an indication of the local structure. The indication may be the window position, the view associated with the local structure, a flag, or other designation of local structure for a known view being detected.

In act 60, acts 50-58 are repeated for a different window position. Any window search pattern may be used. Coarse-to-fine searching may be used, such as where probability or level of ruling out indicates regions for higher or lower resolution searching. In one embodiment, different translations are applied to shift the window in even, small (e.g., a few pixels) steps through the entire data set or image. No rotation is provided in one embodiment, such as where the input image is normalized to provide the local structure at a specific orientation. In other embodiments, the search includes different rotations. No scaling is provided in one embodiment, such as where the input image is normalized to a known scale. In other embodiments, the window is set to different sizes to account for scaling.

More than one window location may be identified as representing the local structure of a view. The different views and/or positions of local structure are reconciled to output a final classification.

In another embodiment shown in FIG. 3, further classification is performed for each of the output local structure indicators. Acts 62-66 represent one or more of the embodiments disclosed in U.S. Published Patent Application No. 20090034808 (Ser. No. 11/775,538, filed Jul. 10, 2007). These acts are summarized below. Other approaches may be used.

Figure 4:
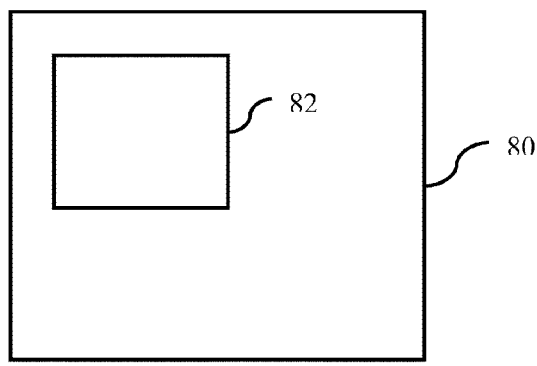
FIG. 4 is a graphical representation of one embodiment of a local structure bounding box and a global structure bounding box.

In act 62, a more global structure is identified for further classification. Given the view determined for detected local structure, additional data representing more of the heart is selected. For example, the left ventricle has different positions relative to other heart structure depending on the view. Given the view, the window is expanded to include the other structure. FIG. 4 shows an initial window 82 for local structure determination. Since the left ventricle for the detected view is in the upper left portion of the heart, the window is expanded as represented at 80 to include additional structure (e.g., valves and/or chambers). The expanded window 80 identifies a region including the local structure and additional structure. This more global structure for each detected local structure is selected for further classification.

In act 64, the more global region is classified with a multi-class global structure classifier. The number of the detected local structures is reduced with the multi-class global structure classifier specific to the classified cardiac standard view. For each view, the different indications or window positions associated with that view are input into the global structure classifier. A different global structure classifier is provided for each of the views. The training data for the global structure classifiers are constructed based on the positive candidates output by the probabilistic boosting network for all the views. For a given view, the multi-class global structure classifier is trained from data output for that view and the other views or classes. Therefore, the global structure training data set is local-structure-dependent for training the multi-class global structure classifier ($MGSC_i$) for each view. For example, four global view classifiers, $MGSC_{A4C}$, $MGSC_{A2C}$, $MGSC_{A3C}$ and $MGSC_{A5C}$ are trained using true and false positives.

For application, the data for the global structure is input to the respective multi-class global structure classifier. The multi-class global structure classifier classifies the global structure as belonging to a view. In one embodiment, the global structure classifier only outputs one of the possible views. In other embodiments, the classifier may output that the global structure does not represent one of the views.

In act 66, a final classification of the view is output. The views output from the multi-class global structure classifiers for the different window positions are integrated. A final cardiac standard view is determined as a fusion of remaining detected local structures. For example, the final view classification result, $\hat{c}$, given a candidate image I, is computed via the MAP rule:

$$\hat{c} = \operatorname{argmin}\left\{P(c_i \mid I) = \sum_{j=1}^{C} P_{MGSC}(c_i \mid j, I) P_{LSD}(j \mid I)\right\} \; i \in [1, C]$$

where $P_{MGSC}(C_i|j, I)$ is the posterior probability of being class $c_i$ from the multi-class global structure classifier ($MGSC_j$) and $P_{LSD}(j|I)$ is the prior probability from the local structure detector ($LSD_j$) of the final level.

In act 68, an indication of the classification is displayed. For example, an image is generated from the echocardiographic data. A text label or graphical symbol is displayed adjacent to or on the image. The text label or symbol indicates the view, such as A3C. The indication is selected as a function of the determination of the view represented by the data. The indication may be in a data field.

Acts 70-74 represent a further embodiment using the classification output in act 66. A gate location is determined for spectral Doppler analysis. The gate location is determined as a function of the classified views. In other embodiments, the view classification is used for other purposes, such as comparison or similarity matching.

Once the view is determined, a location of the Doppler gate is found. The gate is usually located on the path of blood flow, which is a space free of any visible structures on a B-mode image. In act 70, a shape of the local structure is identified in order to place the gate. For example, the chamber outline of the detected left ventricle is determined as described in U.S. Published Patent Application No. 2006/0171586. The anatomy structure, such as the left ventricle and valves annuli are used to infer the target gate location.

In one embodiment, a machine learnt algorithm determines the shape by identifying the structures. For training data, the left ventricle shape and corresponding gate locations are annotated by experts using points (e.g., 17 points for the left ventricle and one point for each gate in the view). Any points may be used for the chamber, such as locations corresponding to specific structure or evenly spaced locations around the chamber wall. By locating the structure or structure shape in an image, the gate location may be inferred. To better determine the shape, the window associated with just the local structure of the final view may be used without structure that is more global.

In act 72, the gate position is located as a function of the shape. The range gate location is set relative to the detected local structure. The left ventricle shape and the image appearance around the left ventricle collaboratively contribute to the final gate locations. In the A4C view, two gate locations are annotated, one for the mitral valve and the other for the tricuspid valve. Only one Doppler gate for the mitral valve is annotated in the A2C view. Two gate locations, one for the mitral valve and one for the aortic valve, are annotated in the A3C view and the A5C view. Other gate locations may be used, such as one for the tricuspid valve in the A5C view. With these annotations, the gate locations, even though ambiguous, may be inferred using the other heart anatomical structures, such as the left ventricle, the aortic valve annulus, the tricuspid valve annulus, and/or other structure.

Act 72 may be performed after act 70 or as part of performing act 70. For example, a database-guided segmentation algorithm infers the left ventricle shape and gate location simultaneously. Each training image is represented using a very high dimensional numerical feature vector. The shape, including both the left ventricle shape and gate locations, is represented as a set of landmark points. The training data are clustered into several clusters in the shape space. The algorithm selects a small number of useful features based on a boosting framework by maximizing the Fisher separation criterion of the clusters.

Figure 5:
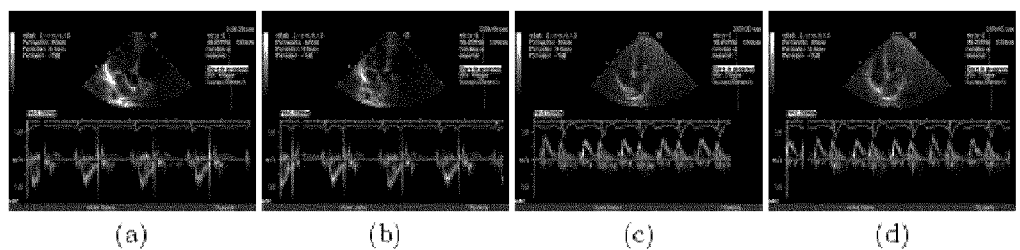
FIG. 5 shows example medical images of standard echocardiographic views and associated spectral Doppler images.

In act 74, spectral Doppler information is measured at the gate position. Doppler spectral imaging is performed for the range gate location. For example, continuous or pulsed Doppler measurements are performed over time for the location. Frequency shift in the returned echoes represent velocity at the range gate. A Fourier transform is applied to determine the spectrum associated with the velocity at the range gate location. FIG. 5 shows two examples (a) and (c) of a classified view and a corresponding spectral Doppler image generated for the view.

The acts of FIG. 3 are performed online or in real time with imaging. For example, the user positions a transducer against or in a patient. As scan data is acquired, the view represented by the scan data (e.g., B-mode image data) is automatically classified. Based on the classification, a range gate may be positioned and spectral Doppler image generated without user placement of the range gate position on the image. Alternatively, the classification is performed off-line or after an imaging session.

In one embodiment, an online version of the algorithm is implemented on a SIEMENS ACUSON SEQUOIA™ ultrasound machine. The Doppler gate is automatically placed in the optimal location as soon as the user enters the Spectral Doppler mode of imaging. In case of ambiguity for cardiac views where more that one valve is present, the user may select the desired valve through a button on the system console.

Scatter plots of MV peak velocity measurements may be created. Peak velocities are computed by placing a gate using an algorithm on the x-axis and mean peak velocities are computed after placing a gate twice by an expert on the y-axis. Intra-user variability may be determined. The correlation coefficient between the automated algorithm versus the expert may be 0.951, which is comparable to the intra-expert variability of 0.966. The gate placement may be generally appropriate up to 100% of the time. Minor manual adjustments may be made to the automatically determined location.

The automatic placement of the range gate may be compared to manual placement. Table 1 shows two confusion matrices of the classification accuracy for training and test data. The data are very diverse in terms of not only image quality but also heart pathology. The average classification accuracy of training data may be over 96%, and that of test data may be close to 95%. As shown in Table 1, most of the classification error may come from the misclassification of A5C to A4C. Some A5C views have a very small aorta structure, which makes the A5C view very similar to the A4C view.

|          | A4C   | A2C  | A3C  | A5C  |
|----------|-------|------|------|------|
| Training Data (%) | | | | |
| A4C(408) | 97.5  | 0.2  | 0.5  | 1.7  |
| A2C(296) | 0.3   | 99.7 | 0.0  | 0.0  |
| A3C(410) | 1.0   | 3.7  | 94.6 | 0.7  |
| A5C(200) | 8.0   | 0.0  | 0.0  | 92.0 |
| Test Data (%) | | | | |
| A4C(23)  | 100.0 | 0.0  | 0.0  | 0.0  |
| A2C(24)  | 0.0   | 96.0 | 4.0  | 0.0  |
| A3C(25)  | 0.0   | 8.0  | 96.4 | 0    |
| A5C(24)  | 13.0  | 0.0  | 4.0  | 83.0 |

Table 2 shows the distance of the gate location between automated gate determination and an expert's annotation. As shown in the table, the algorithm may localize the gate location comparable to experts.

|     | Mitral Valve | | Tricuspid Valve | | Aortic Valve | |
|-----|------|---------|-----------|----------|------|---------|
|     | Mean | | Mean | | Mean | |
|     | (mm) | Std (mm)| Mean (mm) | Std (mm) | (mm) | Std (mm)|
| A4C | 4.2  | 2.5     | 3.4       | 2.5      | —    | —       |
| A2C | 5.9  | 2.4     | —         | —        | —    | —       |
| A3C | 3.5  | 2.2     | —         | —        | 3.4  | 2.3     |
| A5C | 3.6  | 3.6     | —         | —        | 2.4  | 2.4     |

FIG. 5 shows Doppler echocardiogram of Left Ventricular Outflow Tract (LVOT) using an algorithm in (a) and by expert in (b), and that of Mitral valve inflow using an algorithm in (c) and by expert in (d). The spectra are similar.

A fast (e.g., 2 or fewer seconds) algorithm may automatically localize a Doppler gate based on a B-mode image in echocardiography. To improve the scalability, the linear dependency on the number of object classes is removed by employing the Probabilistic Boosting Network (PBN) principle.

While the invention has been described above by reference to various embodiments, it should be understood that many changes and modifications can be made without departing from the scope of the invention. It is therefore intended that the foregoing detailed description be regarded as illustrative rather than limiting and that it be understood that it is the following claims, including all equivalents, that are intended to define the spirit and scope of this invention.

We claim:

1. In a non-transitory computer readable storage medium having stored therein data representing instructions executable by a programmed processor for classification of a view from echocardiographic data, the storage medium comprising instructions for:
classifying, with a first machine learnt multi-class local structure classifier, each of a plurality of echocardiographic data sets associated with different search positions of a window on an image as a cardiac standard view;
selecting, for each of the echocardiographic data sets, a first machine learnt local structure detector as a function of the classified cardiac standard view, different first local structure detectors being available for each of the cardiac standard views;
detecting, with the selected first local structure detector and for each echocardiographic data set, whether the echocardiographic data sets include local structure;
ceasing processing of each of the echocardiographic data sets where the local structure is not detected; and
for each of the echocardiographic data sets where the local structure is detected, repeating the classifying, selecting and detecting with a second machine learnt multi-class local structure classifier and second machine learnt local structure detectors, different second local structure detectors being available for each of the cardiac standard views, the second machine learnt multi-class local structure classifier being more discriminative than the first machine learnt multi-class local structure classifier, and the second machine learnt local structure detectors being different than the respective first machine learnt local structure detectors.

2. The non-transitory computer readable storage medium of claim 1 wherein the first and second machine learnt multi-class local structure classifiers and the first and second machine learnt local structure detectors comprise a probabilistic boosting network.

3. The non-transitory computer readable storage medium of claim 1 wherein the different search positions of the window comprise different translation, orientation, scale, or combinations thereof.

4. The non-transitory computer readable storage medium of claim 1 wherein the first and second multi-class local structure classifiers include view options of at least apical four chamber view, apical five chamber view, apical three chamber view and apical two chamber view, wherein the first and second local structure detectors comprise left ventricle detectors, and wherein the window corresponds to a left ventricle size.

5. The non-transitory computer readable storage medium of claim 1 wherein the instructions further comprise repeating the repeating with third machine learnt multi-class local structure classifier and third machine learnt local structure detectors.

6. The non-transitory computer readable storage medium of claim 1 wherein the instructions further comprise:
selecting global structure around the window for each of the detected local structures after at least the repetition;
reducing a number of the detected local structures with a multi-class global structure classifier specific to the classified cardiac standard view; and
determining a final cardiac standard view as a fusion of remaining detected local structures.

7. The non-transitory computer readable storage medium of claim 1 wherein the instructions further comprise:
determining a range gate location as a function of a shape of the detected local structure; and
Doppler spectral imaging for the range gate location.

* * * * *